Figure 1:
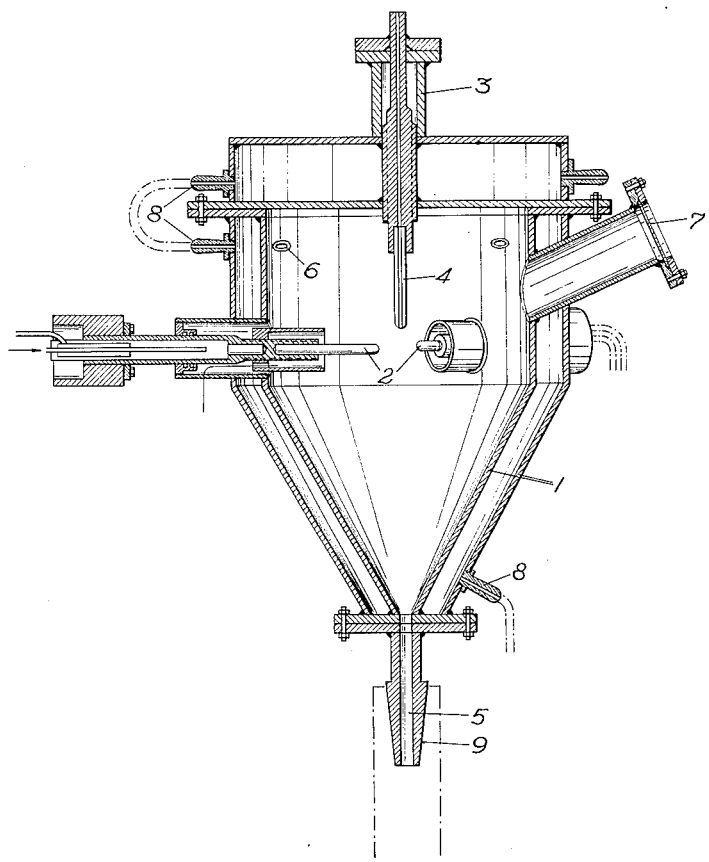

Aug. 3, 1965 H. BILDSTEIN 3,197,810
METHOD AND AN APPARATUS FOR MANUFACTURING
BALL-SHAPED PARTICLES
Filed Sept. 26, 1962 2 Sheets-Sheet 1

Inventor:
HUBERT BILDSTEIN
By: McGlew and Toren
Attorneys

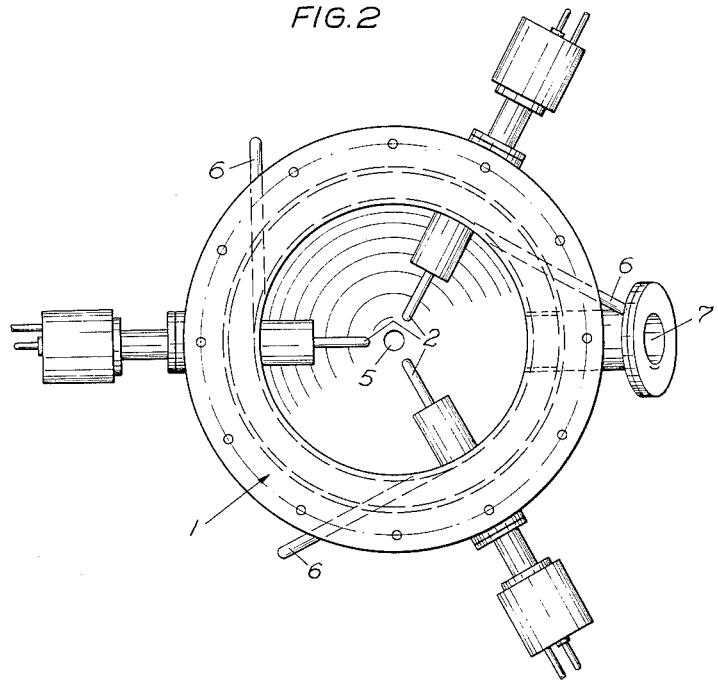

3,197,810
METHOD AND AN APPARATUS FOR MANUFACTURING BALL-SHAPED PARTICLES
Hubert Bildstein, Vienna, Austria, assignor to Österreichische Studiengesellschaft für Atomenergie Ges.m.b.H., Vienna, Austria
Filed Sept. 26, 1962, Ser. No. 226,239
Claims priority, application Austria, Oct. 9, 1961, A 7,578/61
7 Claims. (Cl. 18—1)

In the reactor technics as well as in other fields as for instance in the field of the powder metallurgy it often is necessary to use certain materials in the form of spherical particles, some of said materials having a high melting point which sometimes lies high above 2000° C. Naturally it is difficult to manufacture those ball-shaped particles, and this the more when the materials are radioactive or are extraordinary responsive to air or humidity. It is an object of the invention to provide a method and an apparatus for carrying same out to render it possible to manufacture those ball-shaped particles in an especially simple manner and with a comparatively small input.

Thus the invention first of all refers to a method for manufacturing ball-shaped particles, especially for fuel elements of nuclear reactors and it is characterised in that preferably high-melting materials in the form of a powder and a granulate, respectively, are fed to a melting zone, are molten therein for a short time, and the molten particles thereafter are cooled down to temperatures lying under the melting temperature. According to the invention the powders and the granulates used, respectively, are to be those of metals or of combinations, especially of carbides and of oxides of molybdenum, tungsten, uranium, thorium, titanium, zirconium, hafnium, tantalum and boron, and that in grain sizes which substantially lie within the scope of 40 to 260µ and which preferably are separated into fractions from 50 to 75µ and 150 to 200µ, respectively. According to a further object of the invention the melting process is carried out in a protective gas atmosphere, for instance, in an argon atmosphere, in order to avoid undesired reactions of the molten materials. The apparatus for carrying out the method mentioned above, according to the invention is characterised in a vessel in the interior of which electrodes are provided for forming and for maintaining, respectively, a high frequency arc, the vessel having inlets and outlets for the materials to be treated and preferably a sight glass.

In the drawing the apparatus for carrying out the method according to the invention is shown in one embodiment by way of example.

FIG. 1 shows the apparatus in an axial middle section.

FIG. 2 gives a view of the apparatus according to FIG. 1 from above with the upper part removed.

The apparatus as it is shown in the FIGS. 1 and 2 and which enables the method according to the invention to be carried out continuously, substantially comprises a metal vessel, e.g. a nickel-plated steel-container 1, said vessel being double-walled and having a conical bottom. In its upper part this vessel is formed cylindrical and has a sight glass 7. In the interior of the vessel 1 there are arranged symmetrically three electrodes 2 on an electrode holder which is adapted to be fed; the electrodes are supplied by the three phases of a rotary current supply. The electrode material used preferably is purest graphite; this is used especially if their spherical particles are to be manufactured which are made of carbides. There also can be provided electrodes made of high-melting metals as for instance tungsten. Above the electrodes there is arranged an inlet (lock) 3 for the materials to be molten; said inlet cooperates with a pouring nozzle 4 which preferably consists of graphite and projects close to the arc zone. About within the scope of the inlet nozzle there are arranged the gas inlets 6 for the protective gas, which here are provided radially. A discharge 5 is arranged in the bottom; if it is required a cooler for the ball-shaped particles formed can be connected to the discharge 5 by means of a ground joint 9. For the cooling of the vessel 1 water being a cooling medium is provided in the double-wall of said vessel; for supplying and for leading off the water several short pieces of pipe are provided.

The method according to the invention will now be described more in detail by means of one embodiment; according to this embodiment ball-shaped particles are manufactured of molybdenum carbide as follows:

For operating the arc 3×380 v. rotary current is used over two three-phase-series-resistances connected in parallel and having 10 ohms each (one of them being adapted to be regulated between 10 and 20 ohms). According to the arrangement of the electrodes the arc will be built up flat-shaped in the middle of the vessel. In the operation of the arc which is lighted by contact of the electrodes the phase voltage is 20–25 v. The output yielded in the arc can be regulated about within the limits of 2 and 2.5 kw. The powder which the ball-shaped particles are made of is fed to the metal vessel 1 from a supply bin which must be flushed with argon, by means of an electromagnetic vibrator (which both are not shown in the drawing) through the inlet 3; the maximum throughput gained being about 60 g./h. Due to the gravity the powder falls through the arc zone; thereby the particles are heated for a short time over the melting temperature, in the molten state form a ball, are immediately cooled in this form when falling further and solidify. The apparatus is operated with an over pressure of argon to exclude air from diffusing through eventual leakages for instance at the places where the electrodes are passed through the wall.

According to tests on an average the following losses of material and yields of balls by one throughput have been found:

Powder of the grain size between 60 and 200µ: With a charging amount of 10 g. the losses are about 5 to 10%; this material substantially lies in a molten form on the electrodes. The ball yield is 70–75%.

Powder with a grain size over 200µ: The losses amount to 5%, the ball yields drops to about 30%.

Thus the method according to the present embodiment is fully suitable up to about 200µ only.

The invention is not restricted to the embodiment shown and described. With different original substances satisfying results can be gained also for ball-shaped particles greater than 260µ; eventually even balls of a diameter in the order of about 1000µ can be gained, especially if a material is used which has a somewhat lower melting point.

I claim:

1. Apparatus for making ball-shaped particles from granular material comprising: a double-walled cylindrical vessel having a conical bottom portion and an inlet port at the top portion of said vessel, said inlet port including sealing means for the hermetic sealing of the interior of said vessel from the outside atmosphere, said inlet port being adapted for receiving the granular material from whence it drops by gravity through said cylindrical vessel to said conical bottom portion; means for introducing a coolant between the two walls of said vessel; electrode means for producing a granular material melting temperature arranged within said cylindrical vessel between said inlet port and said conical bottom portion for and forming an electric arc within said cylindrical vessel located within said vessel below said inlet port; a hollow graphite nozzle extending from said inlet port to the region near where said arc is formed for directing the gravitating granules to said arc region whereby, each granule is melted as it gravitates through said region; said vessel being sufficiently elongated to provide a cooling region below said electric arc region to cool said molten granules and to cause rehardening into ball-shaped particles as they further gravitate toward said bottom portion; and, a discharge port in said bottom portion for extracting the ball-shaped particles from said vessel.

2. The apparatus, according to claim 1, wherein said electrode means comprises three spaced-apart electrodes adapted for connection with a three-phase source of electric power.

3. The apparatus, according to claim 1, further comprising means for introducing a protective high-pressure gas into said vessel.

4. The apparatus, according to claim 1, wherein said electrode means comprise a plurality of electrodes of pure graphite.

5. The apparatus, according to claim 1, wherein said electrode means comprise a plurality of metallic electrodes having a high melting point.

6. The apparatus, according to claim 1, further comprising vibration producing means associated with said inlet port for feeding the granular material from said inlet port into and through said hollow graphite nozzle.

7. Apparatus for making ball-shaped particles from granular material comprising: a vessel having an inlet supply nozzle adjacent the top thereof for directing the granular material into said vessel and an outlet below said inlet supply nozzle for discharging the material gravitating to said outlet after it has been converted into ball-shaped particles; there spaced-apart electric arc forming electrodes situated within said vessel intermediate said inlet and outlet; electric power source means connected with said electrodes for causing said electrodes to form an electric arc located centrally with said vessel below said inlet, said electric arc being of a temperature high enough to melt each granule of the material as it falls by gravity through the region wherein the arc is formed, said vessel being of a vertical dimension sufficient to provide a region below said arc of lower temperature to cause each said molten granule to cool and be hardened into a ball-shaped particle as it falls by gravity from the region of the arc toward said outlet.

References Cited by the Examiner

UNITED STATES PATENTS

| | | | |
|---|---|---|---|
| 920,333 | 5/07 | Hughes | 18—2.2 |
| 1,003,271 | 9/11 | Kent | 18—2.2 |
| 1,932,499 | 10/33 | Woods | 18—2.7 |
| 2,038,251 | 4/36 | Vogt | 18—48 |
| 2,044,680 | 6/36 | Gilbert | 18—2.2 |
| 2,189,387 | 2/40 | Wissler | 18—47.2 |
| 2,334,578 | 11/43 | Potters | 18—2.2 |
| 2,619,776 | 12/53 | Potters | 18—2.2 |
| 2,676,892 | 4/54 | McLaughlin | 18—2.2 |
| 2,795,819 | 6/57 | Lesberg et al. | 18—2.4 |
| 2,838,881 | 6/58 | Plumat | 18—2.2 |
| 2,947,115 | 8/60 | Wood | 18—2.2 |

WILLIAM J. STEPHENSON, *Primary Examiner.*

MICHAEL V. BRINDISI, *Examiner.*